US012627932B2

(12) United States Patent
Babb

(10) Patent No.: US 12,627,932 B2
(45) Date of Patent: May 12, 2026

(54) LOUDSPEAKER AND BASKET THEREOF

(71) Applicant: Robert Bosch GmbH, Stuttgart (DE)

(72) Inventor: Alan Babb, Burnsville, MN (US)

(73) Assignee: Bosch Security Systems, LLC, Lancaster, PA (US)

(*) Notice: Subject to any disclaimer, the term of this patent is extended or adjusted under 35 U.S.C. 154(b) by 146 days.

(21) Appl. No.: 18/600,300

(22) Filed: Mar. 8, 2024

(65) Prior Publication Data

US 2025/0287154 A1 Sep. 11, 2025

(51) Int. Cl.
*H04R 9/06* (2006.01)
*H04R 9/02* (2006.01)
*H04R 9/04* (2006.01)

(52) U.S. Cl.
CPC ............ *H04R 9/045* (2013.01); *H04R 9/025* (2013.01); *H04R 2400/11* (2013.01)

(58) Field of Classification Search
CPC ...... H04R 9/045; H04R 2400/11; H04R 9/06; H04R 9/025
USPC .................................. 381/87, 335, 398, 433
See application file for complete search history.

(56) References Cited

U.S. PATENT DOCUMENTS

| | | | |
|---|---|---|---|
| 6,263,084 | B1 | 7/2001 | Cressman et al. |
| 2004/0086143 | A1 | 5/2004 | Espiritu |
| 2008/0118098 | A1 | 5/2008 | Irby et al. |
| 2016/0227325 | A1 | 8/2016 | Pare et al. |
| 2021/0297785 | A1 | 9/2021 | Zhang |

FOREIGN PATENT DOCUMENTS

| | | | | | |
|---|---|---|---|---|---|
| GB | 2542842 A | * | 4/2017 | ............... | H04R 9/06 |
| WO | WO-2007088734 A1 | * | 8/2007 | ............ | H04R 9/041 |

* cited by examiner

*Primary Examiner* — George C Monikang
(74) *Attorney, Agent, or Firm* — Michael Best & Friedrich LLP

(57) ABSTRACT

A loudspeaker including a speaker basket. The speaker basket includes a first frame including an inner surface and an outer surface opposite the inner surface, and a second frame housed in the first frame. The second frame includes a first wall and a second wall, wherein the first wall and the second wall of the second frame engage the inner surface of the first frame.

18 Claims, 4 Drawing Sheets

LOUDSPEAKER AND BASKET THEREOF

BACKGROUND

The present invention relates to a basket for loudspeaker assemblies. A loudspeaker assembly is an electromechanical device that produces acoustic signals across a frequency range depending, at least in part, on the field strength of the permanent magnetic circuit used in the loudspeaker. It is generally accepted that the best way to increase the power handling of a loudspeaker is to increase the surface area of the voice coil, so it can radiate/dissipate more heat. This increase in voice coil surface area almost always increases the mass of the accompanying permanent magnetic circuit. Thus, a high power transducer necessitates a heavier magnetic structure than a low power transducer. The heavier magnetic structure increases the stress on the basket of loudspeaker assemblies.

SUMMARY

The present disclosure provides, in one aspect, a loudspeaker including a speaker basket. The speaker basket includes a first frame having an inner surface and an outer surface opposite the inner surface. The speaker basket further includes a second frame housed in the first frame. The second frame includes a first wall and a second wall. The first wall and the second wall of the second frame engage the inner surface of the first frame.

The present disclosure provides, in one aspect, a speaker basket to house components of a loudspeaker. The speaker basket includes a first frame configured to be coupled to a permanent magnetic circuit at a proximal end of the first frame. The first frame includes an inner surface and an outer surface. The speaker basket further includes a second frame configured to engage the inner surface of the first frame.

The present disclosure provides, in one aspect, a loudspeaker including a permanent magnetic circuit positioned at a proximal end of the loudspeaker and a first frame of a speaker basket coupled to the permanent magnetic circuit. The first frame includes a first wall that encircles a central axis defined by the loudspeaker, a second wall that encircles the central axis and defines an angle with the first wall, and a third wall that encircles the central axis and defines an angle with the second wall. The speaker basket further includes a second frame inside of the first frame. The second frame includes a first wall that encircles the central axis, a second wall that encircles the central axis and defines an angle with the first wall, and a third wall that encircles the central axis and defines an angle with the second wall. The first wall of the first frame engages the first wall of the second frame. The second wall of the first frame engages the second wall of the second frame. The third wall of the first frame engages the third wall of the second frame.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
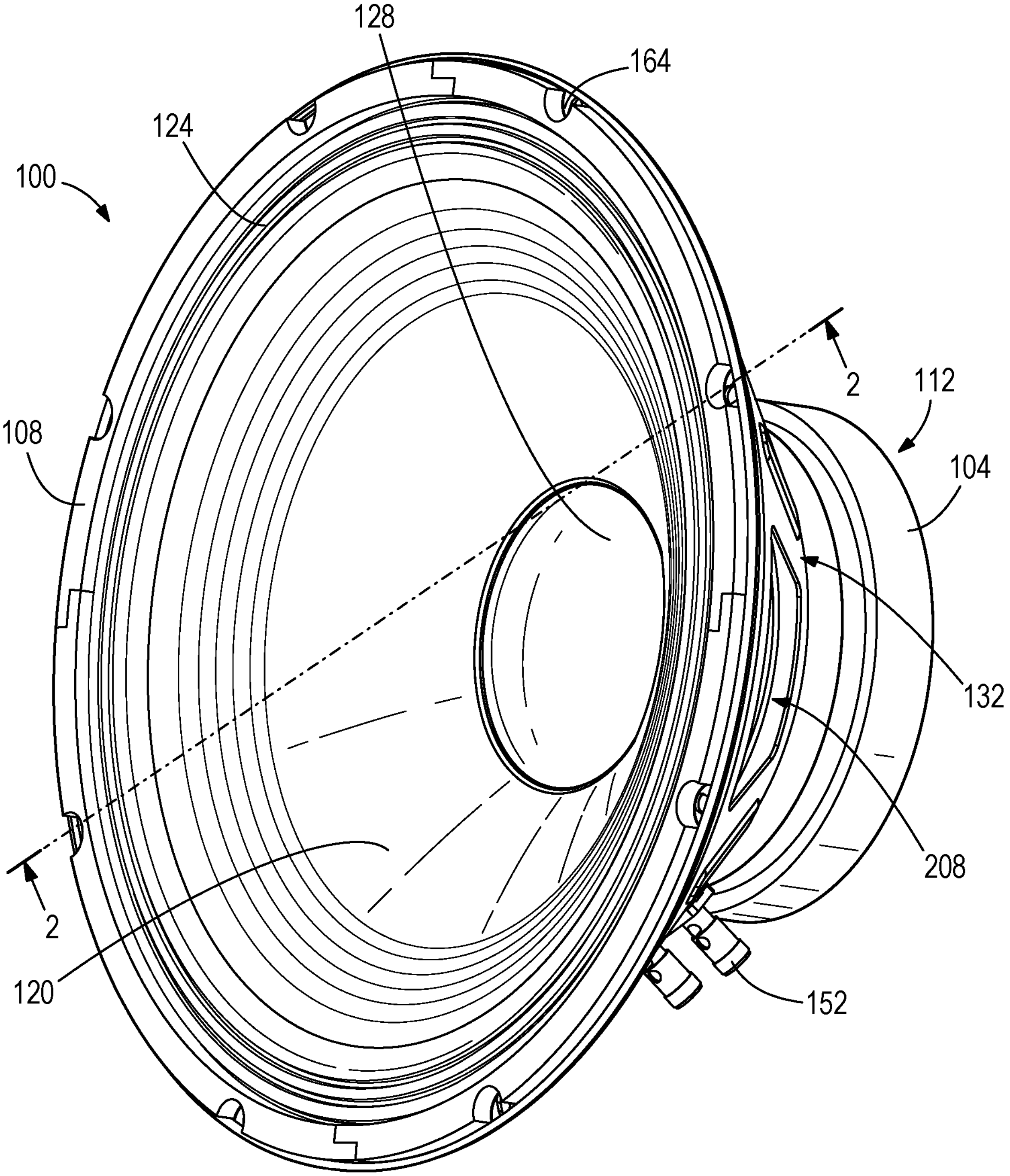
FIG. 1 is a perspective view of a loudspeaker.
Figure 2:
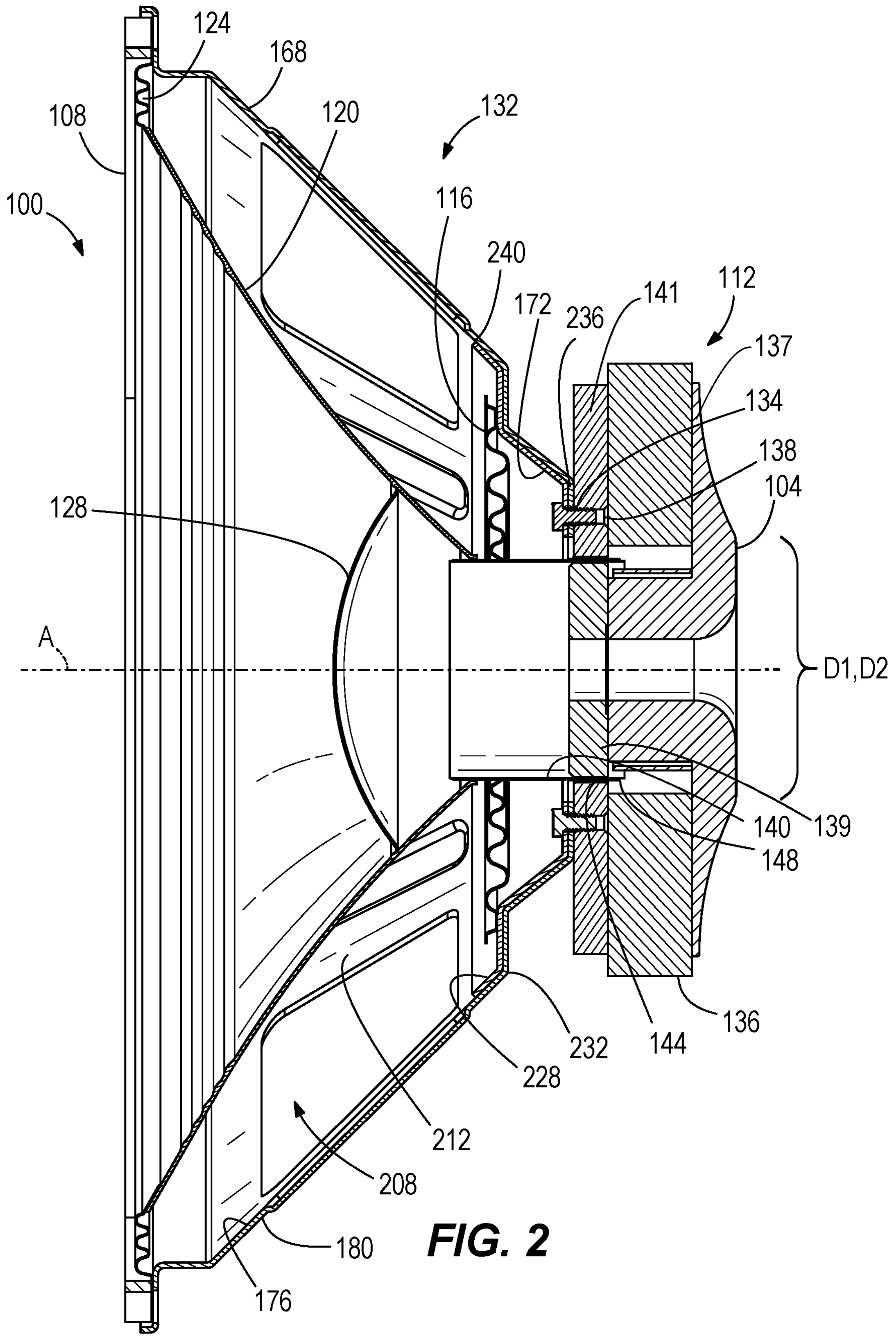
FIG. 2 is a cross-sectional view of the loudspeaker through section line 2-2 on FIG. 1.

FIGS. 1-2 illustrate a loudspeaker 100 according to one embodiment of the present disclosure. The loudspeaker 100 provides an auditory output from an electrical input of an external device (e.g., microphone, cellular device, sound board, etc.). The loudspeaker 100 includes a permanent magnetic circuit 112, a spider 116, a cone 120, a surround 124, a dust cover 128, and a voice coil 140. The loudspeaker 100 defines a central axis A and extends from a proximal end 104 to a distal end 108. The permanent magnetic circuit 112 is magnetically coupled to the voice coil 140 to provide linear movement, along the central axis A, as directed by the electrical input into the voice coil 140. The dust cover 128 is positioned on the proximal end 104 of the cone 120 to protect a gap 144 and the voice coil 140 from unwanted debris. The spider 116 and the surround 124 act as a mechanical spring for the cone 120 as it moves during operation. The permanent magnetic circuit 112 and the voice coil 140 are configured to convert electrical input into a mechanical output, such that sound may be produced from the loudspeaker 100. The permanent magnetic circuit 112 is coupled to a speaker basket 132, such that a portion of the permanent magnetic circuit 112 is received in the basket 132. The permanent magnetic circuit 112 includes a magnet 136, a t-yoke 137, a pole tip 139, and a front plate 141. The magnet 136 defines a generally annular shape around a portion of the voice coil 140. The magnet 136 is magnetized along the central axis A forming proximal and distal flat surfaces of magnetic poles. The t-yoke 137, the pole tip 139, and the front plate 141 serve to redirect the magnetic poles in a radial direction The magnetic poles produce a magnetic field that is concentrated across the gap 144. The magnet 136 may be of varying size depending on the size of the permanent magnetic circuit 112 and the desired output of the loudspeaker 100. In other embodiments, the permanent magnetic circuit 112 may have multiple magnets. The permanent magnetic circuit 112 defines the gap 144, such that the voice coil 140 may move in/out along the central axis A. The voice coil 140 circumscribes a voice coil tube 148 that slides towards or away from the magnet 136 in the gap 144. The movement of the voice coil 140 is dependent upon the input from the external device through a power terminal 152 located on the basket 132. The voice coil 140 receives AC power from the external device and either propels toward the distal end 108 of the loudspeaker 100 or propels towards the proximal end 104 of the loudspeaker 100. Movement of the cone 120, attached to the voice coil 140, creates pressure waves in the air. The pressure waves in the air are defined as the auditory output and can be perceived as sound by the user or audience in front of the distal end 108.

With reference to FIGS. 1-4, the loudspeaker 100 is supported by the basket 132 to house the spider 116, the cone 120, and the surround 124. The basket 132, shown in isolation in FIG. 3, extends between a proximal end 156 and a distal end 160. The basket 132 defines a concave shape between the proximal and distal ends 156, 160. The permanent magnetic circuit 112 is coupled to the proximal end 156 of the basket 132 by a plurality of fasteners 134 (FIG. 2). The distal end 160 of the basket 132 includes a plurality of case mounting apertures 164 (FIG. 1) to couple the loudspeaker 100 to a speaker enclosure (not shown). The basket 132 includes a main frame 168 and a support frame 172. Each of the main frame 168 and the support frame 172 generally forms a stepped conical shape concentric about the central axis A of the loudspeaker 100. As shown, the basket 132 is formed by the two nested frames: the main frame 168 and the support frame 172. However, the basket 132 may optionally include additional frames in other constructions.

Figure 3:
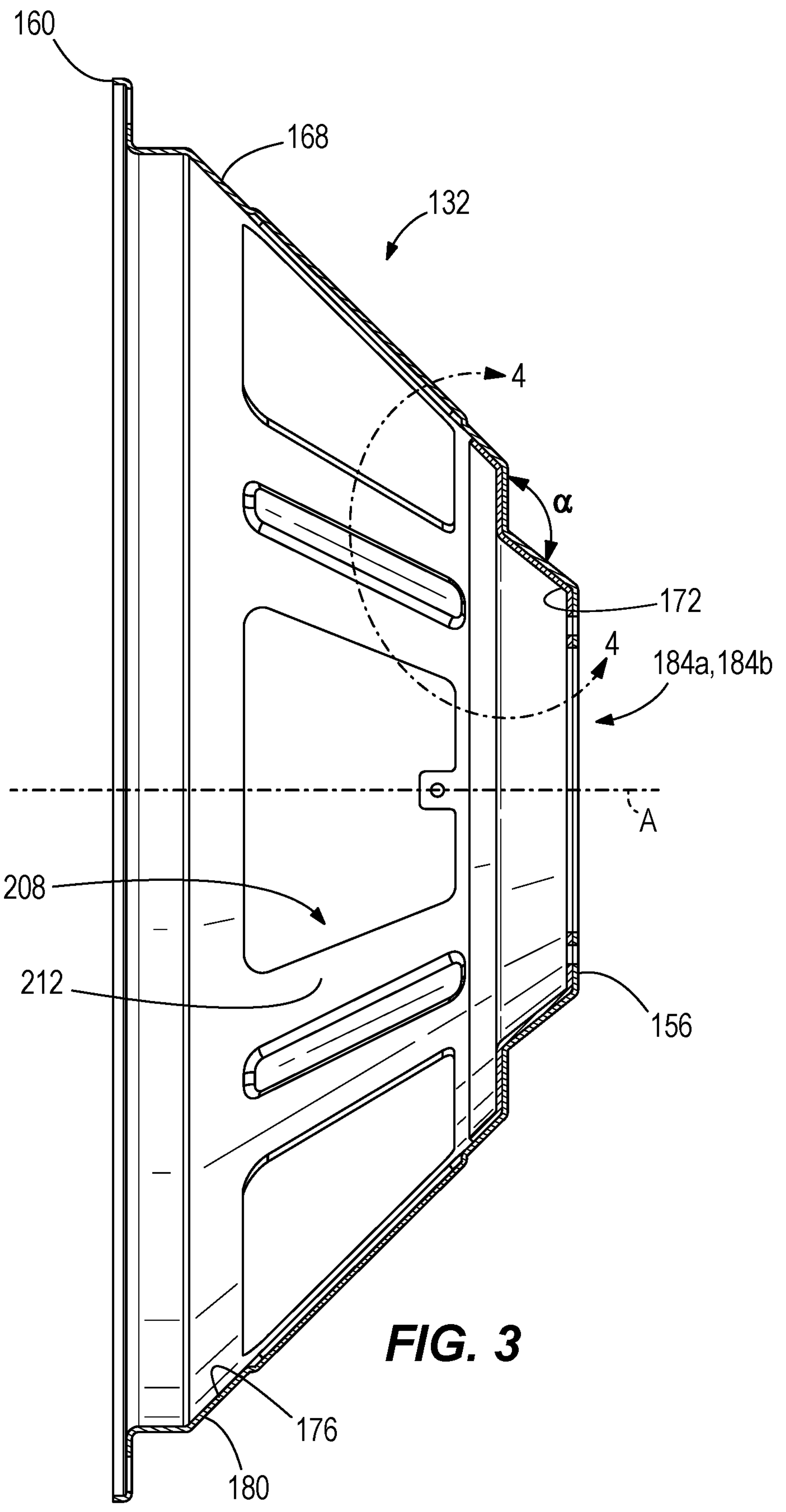
FIG. 3 is a detail view of a first frame and a second frame of a speaker basket of the loudspeaker as shown in FIG. 2.
Figure 4:
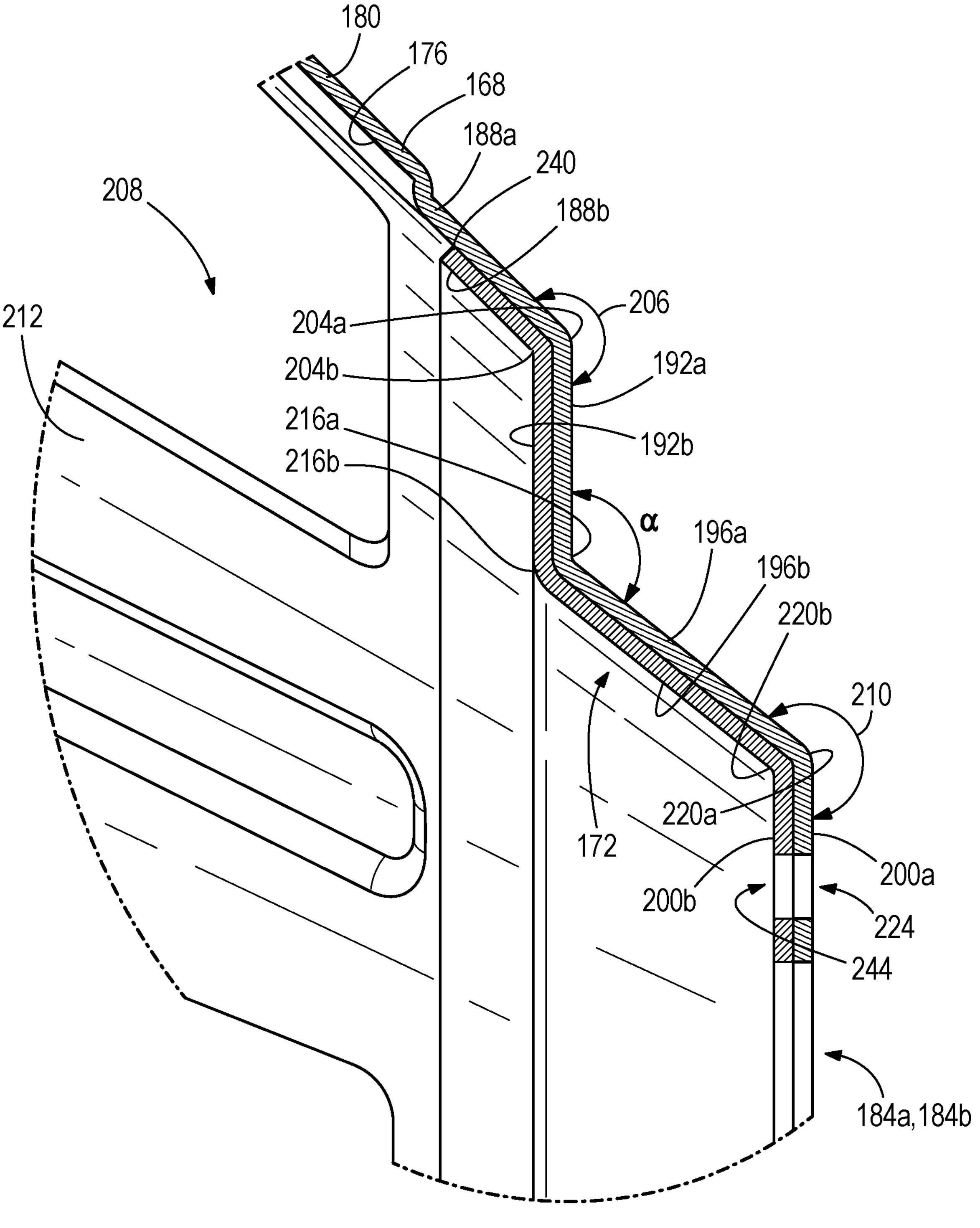
FIG. 4 is an enlarged view of the first frame and the second frame of FIG. 3

With reference to FIGS. 2-4, the main frame 168 encircles the central axis A and extends from the proximal end 156 of the basket 132 to the distal end 160 of the basket 132. The main frame 168 defines an inner surface 176, coupled to the spider 116 and the surround 124, and an outer surface 180 opposite the inner surface 176. The main frame 168 may be a stamped frame constructed from a sheet of metal (e.g., steel). Alternatively, the main frame 168 may be a die cast aluminum frame, a plastic frame, or another suitable material. The sheet forming the main frame 168 may have a thickness of at least 1.0 mm and not more than 1.2 mm in some constructions. On the proximal end 156, the main frame 168 includes a proximal opening 184*a* defining a first diameter D1 measured perpendicular to the central axis A of the loudspeaker 100. The main frame 168 couples to the permanent magnetic circuit 112 on the proximal end 156 and a portion of the permanent magnetic circuit 112 is received within the proximal opening 184*a* of the main frame 168. The main frame 168 includes a plurality of stepped conical walls that encircle the central axis A and form an angle with an adjacent wall. More particularly, the main frame 168 includes an outer conical wall 188*a*, a connecting wall 192*a*, an inner conical wall 196*a*, and a proximal wall 200*a*. However, the main frame 168 may optionally include additional walls in other constructions.

With reference to FIG. 4, the outer conical wall 188*a* forms a conical shape around the central axis A. The outer conical wall 188*a* of the main frame 168 extends from the distal end 160 of loudspeaker 100 to an upper knee 204*a* with the connecting wall 192*a*. The outer conical wall 188*a* includes a plurality of windows 208 extending around the conical shape of the outer conical wall 188*a*. The plurality of windows 208 define generally rectangular apertures in the outer conical wall 188*a*. Positioned between the adjacent plurality of windows 208 is a plurality of struts 212. The plurality of struts 212 span a portion of the outer conical wall 188*a*. Specifically, the plurality of struts 212 are spaced apart from the upper knee 204*a* by a distance.

The connecting wall 192*a* adjoins with the outer conical wall 188*a* at the upper knee 204*a*. The upper knee 204*a* forms a first reflex angle 206 when measured from the outer surface 180 of the main frame 168. The connecting wall 192*a* defines an annular shape around the central axis A and extends between the upper knee 204*a* and an intermediate knee 216*a* with the inner conical wall 196*a*.

The inner conical wall 196*a* forms a conical shape around the central axis A. The inner conical wall 196*a* adjoins the connecting wall 192*a* at the intermediate knee 216*a*. The intermediate knee 216*a* forms an angle α (as measured on the exterior) that is greater than 90 degrees and less than 180 degrees when measured between the outer surface 180 of the connecting wall 192*a* and the inner conical wall 196*a*. The inner conical wall 196*a* extends between the intermediate knee 216*a* and a lower knee 220*a* with the proximal wall 200*a*.

The proximal wall 200*a* defines an annular shape and is generally parallel with the connecting wall 192*a*. The proximal wall 200*a* adjoins the inner conical wall 196*a* at the lower knee 220*a*. The lower knee 220*a* defines a second reflex angle 210 when measured between the inner conical wall 196*a* and the proximal wall 200*a* on the outer surface 180 of the main frame 168. The proximal wall 200*a* includes a first plurality of mounting apertures 224 centered around the central axis A. Each mounting aperture 224 receives one of the plurality of fasteners 134 to couple the main frame 168 to the permanent magnetic circuit 112. The permanent magnetic circuit 112 includes a plurality of fastener bores 138 (FIG. 2) to receive the plurality of fasteners 134.

With reference to FIGS. 2-4, the support frame 172 of the basket 132 is positioned inside of the main frame 168 and may be a stamped frame constructed from a sheet of metal (e.g., steel). Alternatively, the support frame 172 may be a die cast aluminum frame, a plastic frame, or another suitable material. The sheet forming the support frame 172 may have a thickness of at least 1.0 mm and not more than 1.2 mm. In some constructions, the sheet thickness of the support frame 172 is equal to the sheet thickness of the main frame 168. The support frame 172 defines an interior 228 and an exterior 232 opposite the interior 228. The exterior 232 of the support frame 172 engages the inner surface 176 of the main frame 168. The exterior 232 of the support frame 172 may be bonded via an adhesive to the inner surface 176 of the main frame 168. The support frame 172 encircles the central axis A and extends between a proximal end 236 and a distal end 240. The proximal end 236 includes a proximal opening 184*b* to receive a portion of the permanent magnetic circuit 112 and defines a second diameter D2 measured perpendicular to the central axis A of the loudspeaker 100. The first diameter D1 of the main frame 168 is equal to the second diameter D2 of the support frame 172. The distal end 240 of the support frame 172 is positioned in the distance between the plurality of struts 212 and the upper knee 204*a* of the main frame 168. The support frame 172 generally mirrors the plurality of walls of the main frame 168 and therefore includes a corresponding outer conical wall 188*b*, a corresponding connecting wall 192*b*, a corresponding inner conical wall 196*b*, and a corresponding proximal wall 200*b*. The support frame 172 further includes a corresponding upper knee 204*b*, a corresponding intermediate knee 216*b*, and a corresponding lower knee 220*b*.

With reference to FIG. 4, the outer conical wall 188*b* forms a conical shape around the central axis A and is parallel and in engagement with the inner surface 176 of the outer conical wall 188*a* of the main frame 168. The outer conical wall 188*b* defines the distal end 240 of the support frame 172 and therefore does not extend past the plurality of struts 212 of the main frame 168. The outer conical wall 188*b* adjoins the connecting wall 192*b* at the upper knee 204*b*. The upper knee 204*b* defines the first reflex angle 206 when measured from the exterior 232 of the outer conical wall 188*b* and the connecting wall 192*b* of the support frame 172.

The connecting wall 192*b* of the support frame 172 defines an annular shape and is parallel and in engagement with the inner surface 176 of the connecting wall 192*a* of the main frame 168. The connecting wall 192*b* engages with the spider 116 on the interior 228 and the connecting wall 192*a* of the main frame 168 on the exterior 232. The connecting wall 192*b* extends from the upper knee 204*b* to the intermediate knee 216*b* formed with the inner conical wall 196*b*. The intermediate knee 216*b* defines the angle α when measured from the exterior 232 of the connecting wall 192*b* and the inner conical wall 196*b* of the support frame 172.

The inner conical wall 196*b* of the support frame 172 forms a conical shape around the central axis A and is parallel and in engagement with the inner surface 176 of the inner conical wall 196*a* of the main frame 168. The inner conical wall 196*b* extends from the intermediate knee 216*b* to the lower knee 220*b* formed with the proximal wall 200*b*. The lower knee 220*b* defines the second reflex angle 210 when measured from the exterior 232 of the inner conical wall 196*b* and the proximal wall 200*b* of the support frame 172.

The proximal wall 200*b* of the support frame 172 defines an annular shape and is parallel with the connecting wall 192*b* of the support frame 172, the connecting wall 192*a* of the main frame 168, and the proximal wall 200*a* of the main frame 168. The proximal wall 200*b* is in engagement with the inner surface 176 of the proximal wall 200*a* of the main frame 168. The proximal wall 200*b* includes a second plurality of mounting apertures 244 centered around the central axis A. Each of the second plurality of mounting apertures 244 is concentric with one of the first plurality of mounting apertures 224. The plurality of fasteners 134 extend through the first plurality of mounting apertures 224 and the second plurality of mounting apertures 244 to couple the permanent magnetic circuit 112 to the basket 132.

In an alternative embodiment, the basket 132 may include an additional frame positioned inside of the main frame 168 or the support frame 172. The additional frame may be a stamped steel frame, a die cast aluminum frame, a plastic frame, or another suitable material. The addition of another frame may further enhance the strength of the basket 132 and may enable use with even larger transducers.

A transducer used in a loudspeaker includes a voice coil of varying diameter based on the desired maximum auditory output. As the voice coil increases in diameter, the size and weight of the magnet and steel parts used in the permanent magnetic circuit also increases. Typically, a low power transducer uses a stamped steel frame with a voice coil diameter less than 76.2 mm (3 inches). Typically, a high power transducer uses a die cast aluminum frame with a voice coil diameter greater than 76.2 mm (3 inches). Stamped steel frames are advantageous over die cast aluminum frames, as stamped steel frames weigh less and are more cost-effective than die cast aluminum frames. However, a simple stamped steel frame according to the prior art may not support the weight of a high power transducers permanent magnetic circuit. As seen in FIGS. 3-4, the intermediate knee 216*a*,216*b* forms the angle α. If a stamped steel frame of a single sheet according to the prior art is coupled to a high power transducer on its proximal end, the stamped steel frame may distort (e.g., causing the angle α to become asymmetrical about the conical shape), thereby damaging the transducer. The general use of the transducer by the consumer or the shipping process from the manufacture to the consumer may cause the distortion of the stamped steel frame due to the added weight. If such bending of the stamped steel frame occurs, the gap 144 of the permanent magnetic circuit 112, in which the voice coil 140 moves, may decrease. If the clearance for the voice coil 140 defined by the gap 144 decreases from its original condition, the voice coil 140 may engage a portion of the permanent magnetic circuit 112, which may damage the loudspeaker 100. Therefore, the addition of the support frame 172 near the proximal end 156 of the main frame 168 may provide suitable longevity with the use of a high power permanent magnetic circuit, without incurring excess weight and cost associated with a die cast aluminum frame.

Various features of the invention are set forth in the following claims.

What is claimed is:

1. A loudspeaker comprising:

a first frame including an inner surface and an outer surface opposite the inner surface; and a second frame housed in the first frame, the second frame including a knee from which extend both a first wall and a second wall at two different angular orientations, the first and second frames forming a speaker basket, wherein the first wall and the second wall of the second frame engage a portion of the inner surface of the first frame that includes a knee forming an angle that matches an angle formed by the knee of the second frame.

2. The loudspeaker of claim 1, wherein the first frame is a first stamped steel frame, and the second frame is a second stamped steel frame.

3. The loudspeaker of claim 1, wherein the angle of the knees of the first and second frames is greater than 90 degrees and less than 180 degrees when measured at an exterior of the loudspeaker.

4. The loudspeaker of claim 1, further comprising a permanent magnetic circuit, wherein the first frame includes a first plurality of mounting apertures, and the first frame is coupled to the permanent magnetic circuit via a plurality of fasteners that extend through the first plurality of mounting apertures.

5. The loudspeaker of claim 4, wherein the second frame includes a second plurality of mounting apertures, and the plurality of fasteners extend through the second plurality of mounting apertures.

6. The loudspeaker of claim 1, wherein each of the first and second frames has a stepped conical shape concentric about a central axis of the loudspeaker.

7. The loudspeaker of claim 4, wherein the first frame includes a first opening on a proximal end of the loudspeaker and the second frame includes a second opening on the proximal end, and wherein the first opening and the second opening receive a portion of the permanent magnetic circuit.

8. The loudspeaker of claim 7, wherein the first opening defines a first diameter measured perpendicular to a central axis of the loudspeaker, and the second opening defines a second diameter measured perpendicular to the central axis of the loudspeaker, wherein the second diameter is equal to the first diameter.

9. The loudspeaker of claim 1, wherein the second frame is constructed from a sheet and has a thickness of at least 1.0 mm and not more than 1.2 mm.

10. A speaker basket to house components of a loudspeaker, the speaker basket comprising:

a first frame configured to be coupled to a permanent magnetic circuit at a proximal end of the first frame, the first frame including an inner surface and an outer surface; and a second frame configured to engage the inner surface of the first frame, wherein the first frame includes a plurality of struts between the proximal end and a distal end of the first frame, and wherein the second frame has a distal end between the plurality of struts and the proximal end of the first frame.

11. The speaker basket of claim 10, wherein the second frame is bonded to the first frame via an adhesive.

12. The speaker basket of claim 10, wherein the first frame is constructed from a first sheet and the second frame is constructed from a second sheet, and wherein the first and second sheets form a stepped cone geometry.

13. A loudspeaker comprising:
a permanent magnetic circuit positioned at a proximal end of the loudspeaker;
a first frame coupled to the permanent magnetic circuit, the first frame including:
a first wall that encircles a central axis defined by the loudspeaker,
a second wall that encircles the central axis and defines an angle with the first wall, and
a third wall that encircles the central axis and defines an angle with the second wall; and
a second frame inside of the first frame and forming a speaker basket therewith, the second frame including:
a first wall that encircles the central axis,
a second wall that encircles the central axis and defines an angle with the first wall, and
a third wall that encircles the central axis and defines an angle with the second wall,
wherein the first wall of the first frame engages the first wall of the second frame,
wherein the second wall of the first frame engages the second wall of the second frame, and
wherein the third wall of the first frame engages the third wall of the second frame.

14. The loudspeaker of claim 13, wherein the first frame includes a fourth wall that encircles the central axis and defines an angle with the third wall.

15. The loudspeaker of claim 14, wherein the second frame includes a fourth wall that encircles the central axis and defines an angle with the third wall.

16. The loudspeaker of claim 15, wherein the fourth wall of the first frame engages the fourth wall of the second frame.

17. The loudspeaker of claim 13, wherein a fourth wall of the first frame includes a first plurality of mounting apertures, and the first frame is coupled to the permanent magnetic circuit via a plurality of fasteners that extend through the first plurality of mounting apertures.

18. The loudspeaker of claim 17, wherein a fourth wall of the second frame includes a second plurality of mounting apertures, and the second frame is coupled to the permanent magnetic circuit via the plurality of fasteners that extend through the second plurality of mounting apertures.

* * * * *